United States Patent
Wagner

(10) Patent No.: US 9,669,839 B2
(45) Date of Patent: Jun. 6, 2017

(54) METHOD AND DEVICE FOR DETECTING THE ROAD CONDITION FOR A VEHICLE

(71) Applicant: Robert Bosch GmbH, Stuttgart (DE)

(72) Inventor: Marcus Wagner, Lauffen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/015,998

(22) Filed: Feb. 4, 2016

(65) Prior Publication Data

US 2016/0244065 A1 Aug. 25, 2016

(30) Foreign Application Priority Data

Feb. 20, 2015 (DE) .................. 10 2015 203 062

(51) Int. Cl.
| | |
|---|---|
| *B60W 40/06* | (2012.01) |
| *B60G 17/0185* | (2006.01) |
| *B60W 40/068* | (2012.01) |
| *B60G 17/0165* | (2006.01) |
| *B60W 50/00* | (2006.01) |
| *B60W 50/02* | (2012.01) |

(52) U.S. Cl.
CPC ......... *B60W 40/06* (2013.01); *B60G 17/0165* (2013.01); *B60G 17/0185* (2013.01); *B60W 40/068* (2013.01); *B60G 2400/0523* (2013.01); *B60G 2400/821* (2013.01); *B60G 2400/823* (2013.01); *B60G 2400/91* (2013.01); *B60G 2600/1882* (2013.01); *B60G 2800/704* (2013.01); *B60G 2800/802* (2013.01); *B60W 2050/0055* (2013.01); *B60W 2050/0056* (2013.01); *B60W 2050/0057* (2013.01); *B60W 2050/0077* (2013.01); *B60W 2050/021* (2013.01); *B60W 2520/105* (2013.01); *B60W 2520/125* (2013.01); *B60W 2520/14* (2013.01); *B60W 2750/40* (2013.01)

(58) Field of Classification Search
CPC ............ B60W 40/06; B60W 2750/40; B60W 2520/125; B60W 2520/105; B60W 2520/14
USPC ........................................................... 701/36
See application file for complete search history.

(56) References Cited

U.S. PATENT DOCUMENTS 5,065,618 A * 11/1991 Hodges, Sr. ............. G01C 7/04
33/521

FOREIGN PATENT DOCUMENTS

DE 10353481 A1 * 6/2005 ............. B60T 8/172

OTHER PUBLICATIONS

Machine Translation DE 10353481 published Sep. 2005.*

* cited by examiner

*Primary Examiner* — Anne M Antonucci
(74) *Attorney, Agent, or Firm* — Norton Rose Fulbright US LLP; Gerard Messina

(57) ABSTRACT

In a method for detecting the road condition for a vehicle, the following steps are performed: a vehicle dynamics variable describing the dynamics of the motor vehicle is detected while the vehicle is driving; the vehicle dynamics variable is subjected to a frequency analysis; and a road condition variable describing the instantaneous roughness of the roadway surface is ascertained as a function of the frequency analysis of the vehicle dynamics variable.

20 Claims, 2 Drawing Sheets

METHOD AND DEVICE FOR DETECTING THE ROAD CONDITION FOR A VEHICLE

BACKGROUND OF THE INVENTION

1. Field of the Invention

The present invention relates to a method and a device for detecting the condition for a vehicle.

2. Description of the Related Art

A good workmanship condition of the roads and the quality of their roadways are generally monitored and ensured by government authorities. For car drivers and for vehicle dynamics control systems, the roadway condition is an important variable since this, among other things, determines the drivability and the maximum possible speed with the aid of the ascertained friction coefficient. For example, braking on cobblestone pavement must take place sooner than on asphalt since there is less ground contact.

BRIEF SUMMARY OF THE INVENTION

The present invention relates to a method for detecting the roadway condition or road condition for a vehicle, in particular a motor vehicle, in which
- a vehicle dynamics variable describing the dynamics of the motor vehicle is detected while the vehicle is driving,
- the vehicle dynamics variable is subjected to a frequency analysis, and
- a road condition variable describing the instantaneous roughness of the roadway surface is ascertained as a function of the frequency analysis of the vehicle dynamics variable or of the output signal of the frequency analysis or of the frequency-analyzed vehicle dynamics variable.

The present invention thus allows a conclusion to be drawn about the road condition based on vehicle dynamics data detected while the vehicle is driving.

One advantageous embodiment of the present invention is characterized in that
- the frequency analysis is a high pass filtering, and
- a road condition variable describing the instantaneous roughness of the roadway surface is ascertained as a function of the high pass-filtered vehicle dynamics variable.

This high pass filtering allows the noise portion of the vehicle dynamics variable which contains information about the roughness of the roadway surface to be filtered out.

One advantageous embodiment of the present invention is characterized in that the vehicle dynamics variable is the yaw velocity, the longitudinal acceleration, or the transverse acceleration of the motor vehicle. These three variables are detected in any case in numerous modern vehicles as part of a vehicle dynamics control system and are therefore available without added complexity.

One advantageous embodiment of the present invention is characterized in that the vehicle dynamics variable is subjected to an absolute value formation after the high pass filtering.

One advantageous embodiment of the present invention is characterized in that the vehicle dynamics variable is subjected to a low pass filtering after the absolute value formation.

One advantageous embodiment of the present invention is characterized in that the road condition variable is ascertained as a function of the amplitude of the low pass-filtered signal.

One advantageous embodiment of the present invention is characterized in that the ascertained road condition variable and information describing the geographical location of the corresponding road section are transmitted to a vehicle-external database.

One advantageous embodiment of the present invention is characterized in that, in the event that the road condition variable transmitted to the database is inconsistent with other road condition variables present in the database for the same road section, a message is sent from the database to the driver of the transmitting vehicle which indicates the presence of a possible chassis problem to the driver. This allows a chassis problem to be detected before it escalates and results in more severe damage, e.g., within the scope of an accident.

The present invention further includes a device, containing means designed specifically for carrying out the method according to the present invention. This is in particular a control unit in which the program code for carrying out the method according to the present invention is stored.

DETAILED DESCRIPTION OF THE INVENTION

The present invention is essentially based on the evaluation of the yaw velocity signal or another vehicle dynamics signal to obtain a piece of information about the presence of a rough road section. The fundamental sequence of one specific embodiment of the present invention is shown in FIG. 1.

Figure 1:
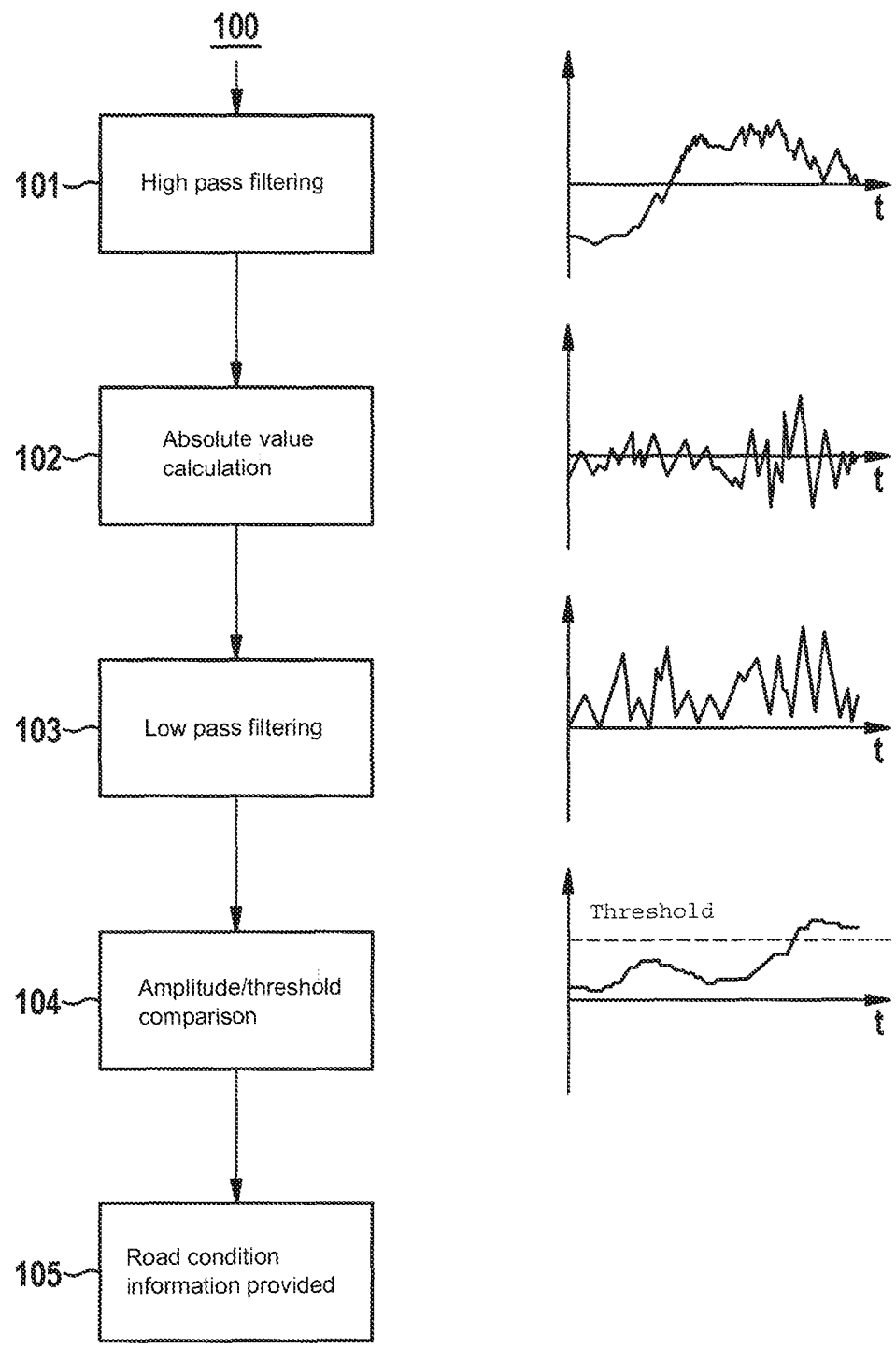
FIG. 1 shows the sequence of one specific embodiment of a method according to the present invention.

In the left column, FIG. 1 shows the fundamental sequence of one specific embodiment of a method according to the present invention. Yaw velocity signal 100 taken from the inertial sensor system of a vehicle dynamics control system is subjected to a high pass filtering in block 101. This causes the useful portion of the signal, which is typically in the range between 0 Hz and 5 Hz, to be removed. This useful portion describes the dynamics of the vehicle attributable in particular to steering movements. What remains at the output of block 101 is the noise portion of the signal. For simpler further processing, the absolute value of the noise portion is subsequently calculated in block 102. Thereafter, in block 103, the amount of the noise portion is smoothed using a low-pass filter and thus rendered comparable. The amplitude of this signal is compared to a threshold value in block 104 and provides information about the road condition in block 105. During an application phase, it is possible to traverse different roadway types with the vehicle and store the amplitudes obtained at the output of block 103. Here, it applies that an increasing amplitude indicates an increasingly worse road condition or an increasing roughness or an increasing unevenness of the road surface. Instead of the yaw velocity signal, it is also possible, e.g., to consider the longitudinal or transverse acceleration signal. The time t is plotted in the x-axis direction in each case in the right column of FIG. 2. The topmost diagram in the y-axis direction shows the yaw raw signal, the diagram beneath shows its high pass-filtered value, the diagram beneath that shows its absolute value, and the lowermost diagram shows the output signal after a low pass filtering and a threshold value.

The detection of the road condition, e.g., gravel, stone chips, paving stones, rough road or washboard road, may also be achieved using other frequency-evaluating methods, e.g., the fast Fourier transform or the wavelet analysis. It is important to have traversed the different section types at least once for each vehicle or each vehicle type to have reference values. The information about the road condition may also be communicated to other vehicles, e.g., by using a data cloud. In this way, other road users may be warned. However, it is also possible this way to carry out a control and, if necessary, a correction of the driver's own calculation. For example, when all other vehicles detect a good roadway condition, but the host vehicle, however, detects a poor condition at the same location, a problem on the chassis of the host vehicle may be inferred.

Figure 2:
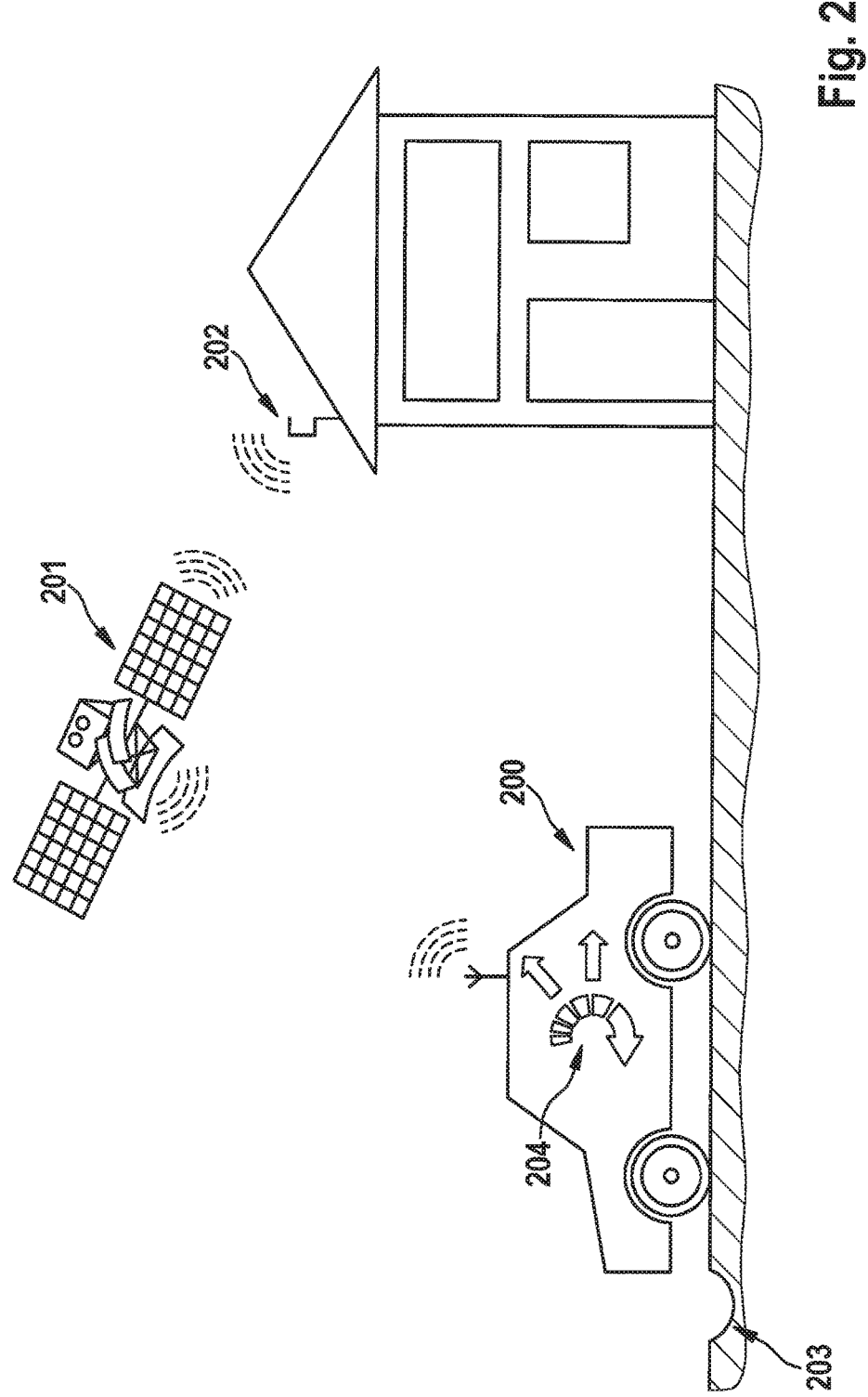
FIG. 2 shows a representation of the data transmission.

FIG. 2 shows a vehicle 200 which is passing across a pothole or an unevenness 203 of the road. With the aid of a sensor system 204, the yaw velocity or the longitudinal or transverse acceleration is ascertained in the vehicle, and a road condition variable describing the roughness or unevenness of the roadway surface is ascertained based on these data. If a suitable sensor system is present, the ascertained vertical acceleration may also analogously be used to ascertain the road condition variable.

The vehicle transmits the present ascertained road condition and the associated location via GPS and GSM to a satellite 201, which in turn forwards this information to a database 202, which in turn is located in a road maintenance department or another evaluation site, for example.

What is claimed is:

1. A method for detecting the road condition for a vehicle, comprising:
    detecting, by a vehicle sensor device, a vehicle dynamics variable describing the dynamics of the motor vehicle while the vehicle is being driven;
    performing, by a computing device of the vehicle having at least one processor, a frequency analysis of the vehicle dynamics variable, the frequency analysis comprising a first filtering operation, an absolute value calculation operation, and a second filtering operation separate from the first filtering operation; and
    ascertaining, by the at least one processor, as a function of the frequency analysis of the vehicle dynamics variable, a road condition variable describing the instantaneous roughness of the roadway surface.

2. The method as recited in claim 1, wherein:
    the first filtering operation comprises a high pass filtering; and
    the road condition variable describing the instantaneous roughness of the roadway surface is ascertained as a function of the high pass-filtered vehicle dynamics variable.

3. The method as recited in claim 2, wherein the vehicle dynamics variable is subjected to the absolute value calculation operation after the high pass filtering.

4. The method as recited in claim 3, wherein the second filtering operation comprises a low pass filtering after the absolute value calculation operation.

5. The method as recited in claim 4, wherein the road condition variable is ascertained as a function of an amplitude of the low pass-filtered signal.

6. The method as recited in claim 1, wherein the vehicle dynamics variable is one of a yaw velocity, a longitudinal acceleration, a transverse acceleration, or a vertical acceleration of the motor vehicle.

7. The method as recited in claim 1, wherein the ascertained road condition variable and information describing a geographical location of a corresponding road section for the road condition variable are transmitted to a vehicle-external database.

8. The method as recited in claim 7, wherein, in the event that the road condition variable transmitted to the database is inconsistent with other road condition variables present in the database for the road section, a message is sent from the database to the driver of the vehicle, wherein the message indicates to the driver the existence of a possible chassis problem.

9. The method as recited in claim 7, wherein the information describing a geographical location of a corresponding road section for the road condition variable is transmitted to the vehicle-external database via GPS.

10. The method as recited in claim 7, wherein the information describing a geographical location of a corresponding road section for the road condition variable is wirelessly transmitted to the vehicle-external database.

11. The method as recited in claim 1, wherein the first filtering operation removes a first signal portion that describes one or more dynamics of the vehicle attributable to steering movements and passes through a second signal portion that is a noise portion.

12. The method as recited in claim 11, wherein the second filtering operation smooths the noise portion.

13. The method as recited in claim 1, wherein the ascertained road condition variable is transmitted to one or more other vehicles.

14. A non-transitory, computer-readable data storage medium storing a computer program having program codes which, when executed on a computer having at least one processor, perform a method for detecting the road condition for a vehicle, the method comprising:
    detecting a vehicle dynamics variable describing the dynamics of the motor vehicle while the vehicle is being driven;
    performing a frequency analysis of the vehicle dynamics variable, the frequency analysis comprising a first filtering operation, an absolute value calculation operation, and a second filtering operation separate from the first filtering operation; and
    ascertaining, as a function of the frequency analysis of the vehicle dynamics variable, a road condition variable describing the instantaneous roughness of the roadway surface.

15. The medium as recited in claim 14, wherein the ascertained road condition variable and information describing a geographical location of a corresponding road section for the road condition variable are transmitted to a vehicle-external database.

16. The medium as recited in claim 15, wherein, in the event that the road condition variable transmitted to the database is inconsistent with other road condition variables present in the database for the road section, a message is sent from the database to the driver of the vehicle, wherein the message indicates to the driver the existence of a possible chassis problem.

17. The method as recited in claim 15, wherein the information describing a geographical location of a corresponding road section for the road condition variable is wirelessly transmitted to the vehicle-external database.

18. A method for detecting the road condition for a vehicle, comprising:
    detecting, by a vehicle sensor device, a vehicle dynamics variable describing the dynamics of the motor vehicle while the vehicle is being driven;

performing, by a computing device of the vehicle having at least one processor, a frequency analysis of the vehicle dynamics variable;

ascertaining, by the at least one processor, as a function of the frequency analysis of the vehicle dynamics variable, a road condition variable describing the instantaneous roughness of the roadway surface; and transmitting, by the vehicle, the ascertained road condition variable and information describing a geographical location of a corresponding road section for the road condition variable to a vehicle-external database.

19. The method as recited in claim 18, wherein the information describing a geographical location of a corresponding road section for the road condition variable is wirelessly transmitted to the vehicle-external database.

20. The method as recited in claim 19, further comprising:

receiving, by the vehicle, a message to the driver from the database if the road condition variable transmitted to the database is inconsistent with other road condition variables present in the database for the road section, wherein the message indicates to the driver the existence of a possible chassis problem.

* * * * *